United States Patent
Schmaling et al.

(10) Patent No.: US 8,142,158 B2
(45) Date of Patent: Mar. 27, 2012

(54) COMPACT LOAD PATH SWASHPLATE ASSEMBLY

(75) Inventors: David N. Schmaling, Southbury, CT (US); Michael R. Robbins, Guilford, CT (US); Frank P. D'Anna, Seymour, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1674 days.

(21) Appl. No.: 11/292,647

(22) Filed: Dec. 2, 2005

(65) Prior Publication Data

US 2007/0128037 A1 Jun. 7, 2007

(51) Int. Cl.
*B64C 27/04* (2006.01)

(52) U.S. Cl. ........................ 416/149; 416/159

(58) Field of Classification Search .............. 416/104, 416/114, 149, 150, 159
See application file for complete search history.

(56) References Cited

U.S. PATENT DOCUMENTS

| | | | |
|---|---|---|---|
| 3,841,586 A * | 10/1974 | Broadley et al. ............ 244/17.25 |
| 4,538,961 A * | 9/1985 | Pariani ............................ 416/114 |
| 4,573,873 A | 3/1986 | Yao et al. |
| 4,585,392 A | 4/1986 | Curei |
| 4,669,958 A | 6/1987 | Peyran et al. |
| 4,688,993 A | 8/1987 | Ferris et al. |
| 4,696,445 A | 9/1987 | Wright et al. |
| 5,083,725 A | 1/1992 | Byrnes et al. |
| 5,092,738 A | 3/1992 | Byrnes et al. |
| 5,135,356 A | 8/1992 | Shepherd |
| 5,240,661 A | 8/1993 | Parker et al. |
| 5,242,267 A | 9/1993 | Byrnes et al. |
| 5,340,279 A | 8/1994 | Cycon et al. |
| 5,372,479 A | 12/1994 | Byrnes et al. |
| 5,431,538 A | 7/1995 | Schmaling et al. |
| 5,431,540 A | 7/1995 | Doolin et al. |
| 5,460,487 A | 10/1995 | Schmaling et al. |
| 5,499,903 A | 3/1996 | Schmaling et al. |
| 5,511,947 A | 4/1996 | Schmuck |
| 5,562,415 A | 10/1996 | Legendre et al. |
| 5,599,167 A | 2/1997 | Daldosso |
| 5,628,620 A | 5/1997 | Arlton |
| 5,740,987 A | 4/1998 | Morris et al. |

(Continued)

OTHER PUBLICATIONS

Sikorsky Aircraft Corporation generated history of swashplate types.

*Primary Examiner* — Edward Look
*Assistant Examiner* — Aaron R Eastman
(74) *Attorney, Agent, or Firm* — Carlson Gaskey & Olds P.C.

(57) ABSTRACT

A swash plate assembly includes a rotationally stationary swash plate and rotational swash plate which rotates relative to the rotationally stationary swash plate through a bearing system. Each servo control rod is attached to the swash plate assembly to communicate control inputs thereto through a respective servo lug. Each servo lug defines a servo pivot point off an in-line plane inboard of the bearing system. As the servo lugs extend below the rotationally stationary swash plate, a relatively uncomplicated attachment arrangement is facilitated which provides for redundant locking features at a highly inspectable location which simplifies maintenance and increased safety. By locating the servo pivot point just inboard of the bearing system, an exceeding compact load path is defined thereby. The load path is defined from the servo control, to the servo lug, through the rotationally stationary swash plate, bearing system, the rotational swash plate, the rotor pitch control point and into the pitch control rod.

17 Claims, 8 Drawing Sheets

U.S. PATENT DOCUMENTS

| | | | |
|---|---|---|---|
| 5,810,562 A * | 9/1998 | Byrnes et al. | 416/114 |
| 5,906,476 A | 5/1999 | Arlton | |
| 6,033,182 A * | 3/2000 | Rampal | 416/114 |
| 6,074,168 A | 6/2000 | Rampal et al. | |
| 6,102,659 A | 8/2000 | Rampal | |
| 6,149,386 A | 11/2000 | Rampal | |
| 6,152,696 A | 11/2000 | Rampal | |
| 6,200,097 B1 | 3/2001 | Mouille | |
| 6,231,005 B1 | 5/2001 | Costes | |
| 6,280,141 B1 | 8/2001 | Rampal et al. | |
| 6,325,326 B1 * | 12/2001 | Pancotti | 244/17.25 |
| 6,360,987 B1 | 3/2002 | Sallaee et al. | |
| 6,886,777 B2 | 5/2005 | Rock | |
| 2004/0126238 A1 | 7/2004 | Scala | |

* cited by examiner

COMPACT LOAD PATH SWASHPLATE ASSEMBLY

BACKGROUND OF THE INVENTION

The present invention relates to a rotary wing aircraft, and more particularly to an in-line swash plate assembly for controlling the main rotor blade pitch of a rotary wing aircraft main rotor system.

Control of a helicopter is affected by varying the pitch of the rotor blades individually as the rotor rotates and by varying the pitch of all of the blades together. These are known respectively as cyclic and collective pitch control. Blade pitch control of a rotary wing aircraft main rotor is typically achieved through a swash plate assembly which transfers the motion of non-rotating control members to the rotating members.

The swash plate assembly is typically concentrically mounted about a rotor shaft. The swash plate assembly generally includes two rings connected by a series of bearings with one ring connected to the airframe (stationary), and the other ring connected to the rotor hub (rotating). The rotating ring is connected to the rotor hub through a pivoted link device typically referred to as "scissors", with the static ring similarly connected to the airframe. The rotating swash plate rotates relative the stationary swash plate. Apart from rotary motion, the stationary and rotating swash plate otherwise move as a unitary component.

Control rods mounted to the main rotor blades are connected to lugs formed on the rotating swash plate and operate to transfer loads between the swash plate and the main rotor blades. Main rotor servos extend between and attach to the stationary swash plate and the aircraft fuselage. Displacement of the servos results in corresponding displacement of the stationary swash plate. Hence, by actuating selected servos, collective and cyclic commands are transferred to the rotor head as vertical and/or tilting displacement of the stationary and rotating swash plates.

Collective control is achieved by translating the swash plate assembly up and down with respect to the rotor shaft and cyclic control is achieved by tilting the swash plate relative to the rotor shaft. The stationary ring is typically mounted about the rotor shaft through a spherical ball joint or uniball that allows for tilt of the swash plate assembly, with the standpipe surrounding the rotor shaft allowing translation of the swash plate assembly. The pitch links connect the rotating ring of the swash plate assembly to the pitch or control arms of the rotor blades. The stationary swash plate assembly of the swash plate assembly is positioned by servos which are actuated in response to the pilot's control signals. Thus, when the pilot inputs a control command, the stationary swash plate assembly to be raised, lowered or tilted and the rotating swash plate assembly of the swash plate assembly follows to a collectively or cyclically position the rotor disc.

Certain overall axial and width requirement are required for the swash plate assembly linkages to operate properly. However, to facilitate transportation within a cargo aircraft and/or provide accommodation within a ship hangar, modern rotorcraft, particularly military rotor craft must offer compactness of the main rotor and associated swash plate assembly. Such compactness may be limited by the interference between the linkages and by the maximum swiveling angles permitted by the construction of the articulatable joints and links.

As swash plate assemblies are subject to a substantial amount of movement, wear is typical and these parts are generally high-maintenance components. In addition, the linkages are particularly vulnerable when used in military aircraft where a ballistic impact may cause failure of the swash plate assembly control system. Typically, the more compact the swash plate assembly, the more complicated the linkage geometry and the greater the number of linkages required to achieve a desired range of motion. Furthermore, the articulatable linkage geometry directly effects the loads applied to the swash plate assembly. The loads applied to the swash plate assembly during normal operation include shear, bending, and torsional loads. Furthermore, the more compact the swash plate assembly and the more complicated the linkage, the longer the load path through the swash plate assembly. Various prior art swash plate assembly designs such as "in-line" and "over-under" designs provide various tradeoffs of compactness, complexity and length of load paths.

Accordingly, it is desirable to provide an uncomplicated, short load path swash plate assembly which provides the desired compactness.

SUMMARY OF THE INVENTION

A swash plate assembly according to the present invention includes a rotationally stationary swash plate and rotational swash plate which rotates relative to the rotationally stationary swash plate through a bearing system. The bearing system includes a duplex bearing which need not increase to accommodate bolt or expandable pin removal as typical of conventional systems. Such a bearing system provides for an uncomplicated and lightweight arrangement.

Each servo control rod is attached to the swash plate assembly to communicate control inputs thereto through a respective servo lug. Each servo lug defines a servo pivot point off an in-line plane inboard of the bearing system. As the servo lugs extend below the rotationally stationary swash plate, a relatively uncomplicated attachment arrangement is facilitated as compared to a more conventional trunion attachment. Attachment is provided by a servo lug fastener such as bolted connection. Such attachment facilitates for redundant locking features at a highly inspectable location which simplifies maintenance and increases safety.

Each pitch control rod is attached to the rotational swash plate assembly to communicate pitch commands to a respective rotor blade assembly through a respective pitch lug which defines a rotor pitch control point. The rotor pitch control point as defined by the rotational swash plate is located on the in-line plane which passes through the central pivot point.

By locating the servo pivot point just inboard of the bearing system, an exceeding compact load path is defined thereby. The load path is defined from the servo control rod, to the servo lug, through the rotationally stationary swash plate, bearing system, the rotational swash plate, the rotor pitch control point and into the pitch control rod.

The present invention therefore provides an uncomplicated, short load path swash plate assembly which provides the desired compactness.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
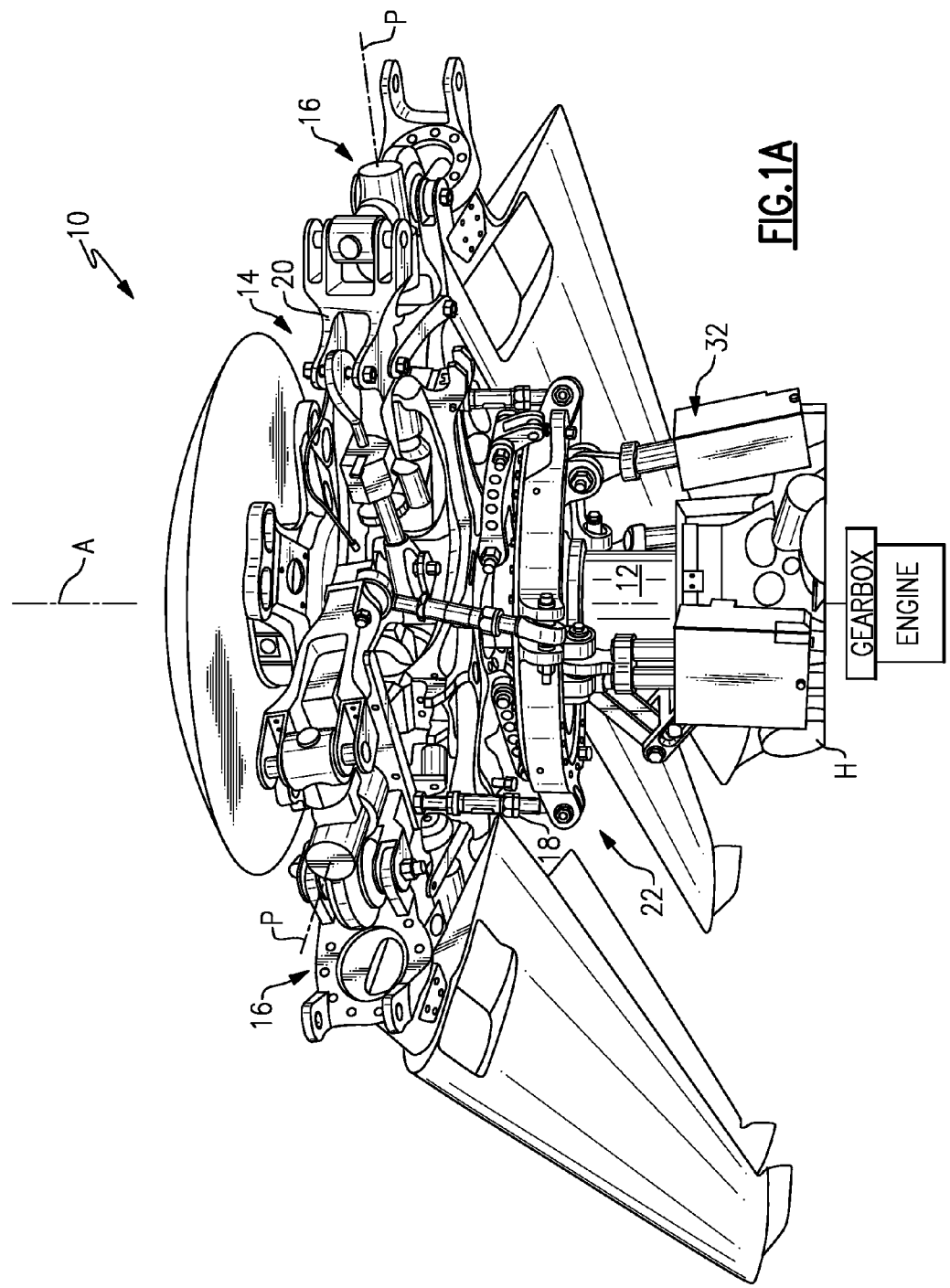
FIG. 1A is a perspective view of an exemplary rotor system embodiment for use with the swash plate assembly of the present invention.

FIG. 1A illustrates a general perspective view of a rotor system 10 which includes a rotor shaft 12 driven in conventional fashion by an engine through a reduction gearing for rotation about an axis of rotation A. A rotor hub 14 is mounted to the rotor shaft 12 for rotation therewith about an axis of rotation to support a multiple of rotor blade assemblies 16 (illustrated schematically) therefrom.

Each blade assembly 16 is mounted to the rotor hub 14 so as to be flexible about a pitch change axis P (blade assemblies shown folded in FIG. 1A). It should be understood that various attachment systems and rotor blade pitch change systems are usable with the present invention. Pitch change loads are imparted to each rotor blade assembly 16 by pitch control rods 18 which are articulatably connected at one end to the rotor blade assembly 16 at a pitch horn 20. The opposite end of the pitch control rod 18 is articulately connected to a swash plate assembly 22.

Figure 1B:
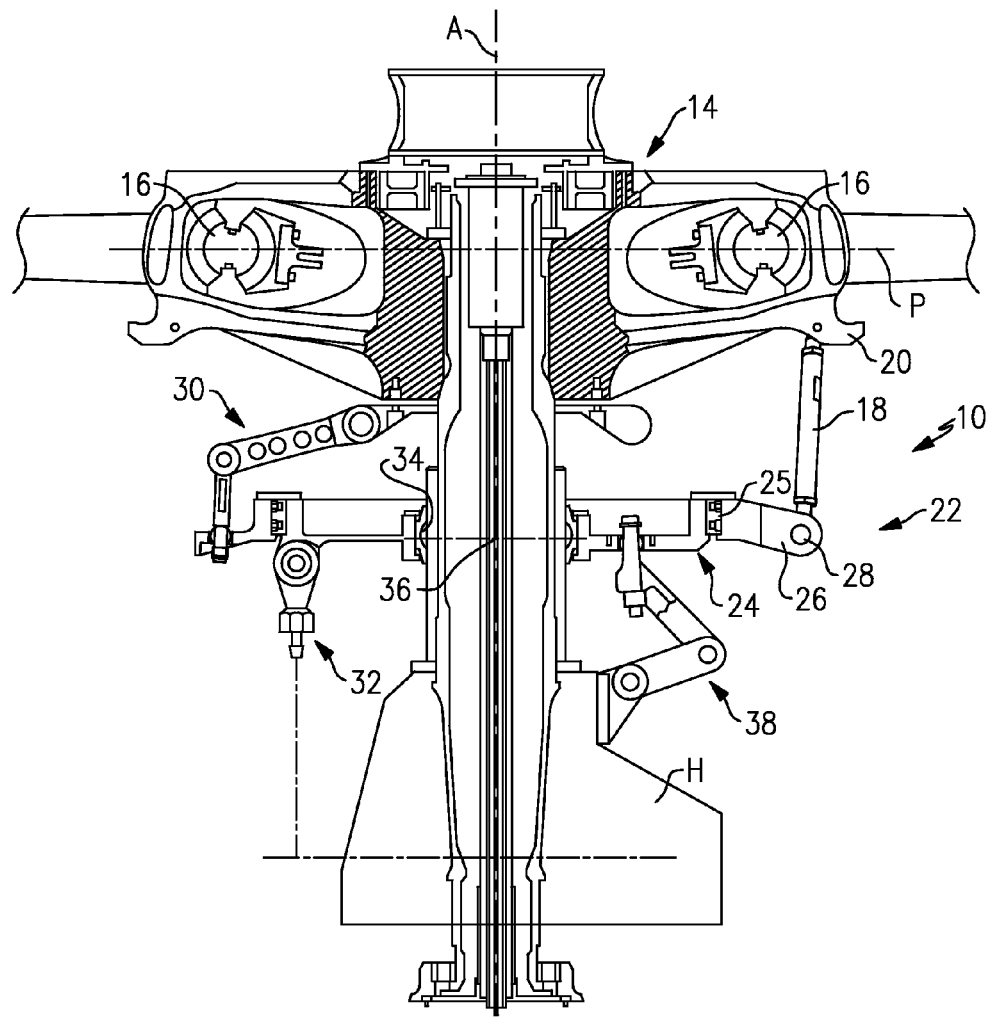
FIG. 1B is a sectional view of a rotor system taken along the axis of rotation.
Figure 1C:
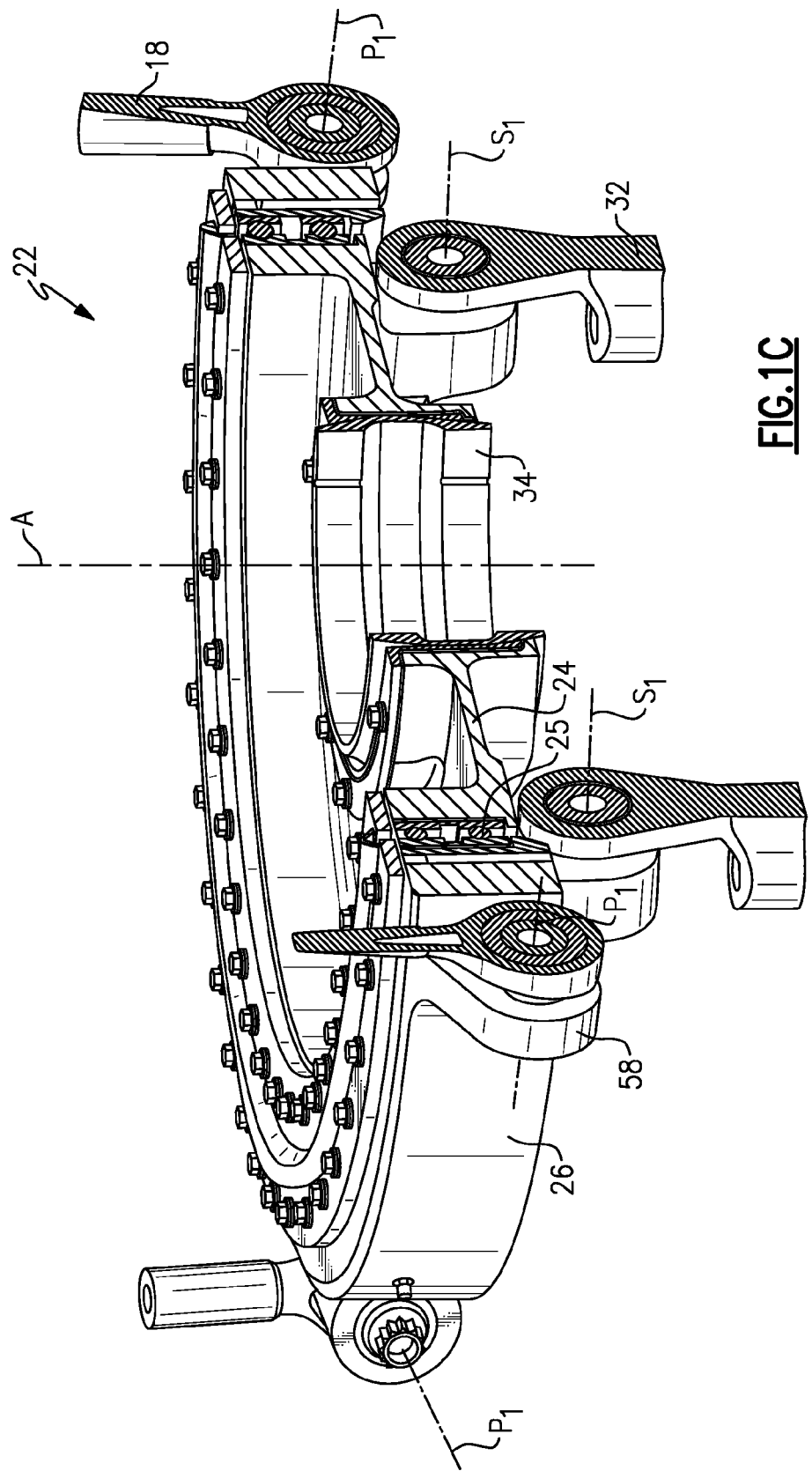
FIG. 1C is a perspective partial sectional view of a swash plate assembly according to the present invention.

Referring to FIG. 1B, the swash plate assembly 22 includes a rotationally stationary swash plate 24 and rotational swash plate 26 which rotates relative to the rotationally stationary swash plate 24 through a bearing system 25 (also illustrated in FIG. 1C). The bearing system 25 is preferably a duplex bearing which need no increase to accommodate bolt or expandable pin removal as typical of conventional systems. Such a bearing system provides for an uncomplicated and lightweight arrangement.

A stationary scissors assembly 38 is mounted between the rotationally stationary swash plate 24 and a stationary housing H of the rotor system 10. A rotational scissors bridge assembly 30 is mounted to the rotational swash plate 26 and the rotor hub 14 for rotation relative thereto. The swash plate assembly 22 receives control inputs from a set of servo control rods 32.

Pitch control commands imparted by swash plate assembly servo control rods 32 cause tilting of the swash plate assembly 22 about a uniball 34 which defines a central pivot point 36 located along the axis of rotation A. Tilting of the swash plate assembly 22 about the central pivot point 36 imparts pitch change loads to each blade assembly 16 through the pitch control rods 18 which are mounted to the rotational swash plate 26 about a respective pitch control point 28. Articulation of the swash plate assembly 22 drives the pitch control rods 18 which cause the blade assembly 16 to pitch about the pitch change axis p. Inputs from the servo control rods 32 cause the swash plate assembly 22 to axially translate along axis of rotation A to impart pitch control loads to the blade assemblies 16. When swash plate assembly 22 translates along axis A, it imparts collective pitch change to blade assemblies 16, and when it tilts about central pivot point 36, it imparts cyclic pitch change.

Figure 2:
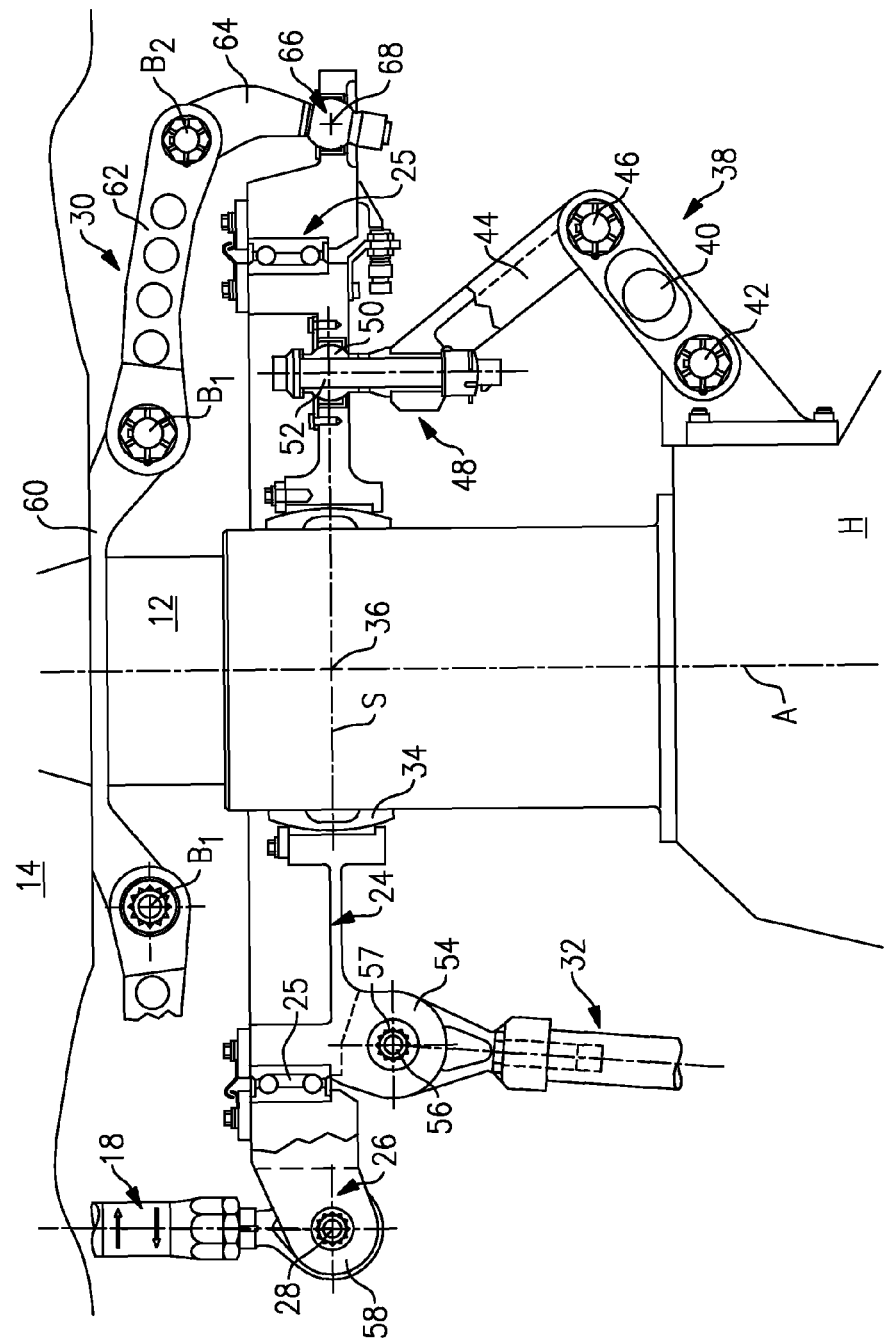
FIG. 2 is a schematic sectional view of the swash plate assembly of the present invention taken along the axis of rotation.

Referring to FIG. 2, the rotationally stationary swash plate 24 is mounted to the rotor shaft 12 through the uniball 34 yet permits tilting of the swash plate assembly 22 about the central pivot point 36 and translation thereof along the axis of rotation A as generally understood. The stationary scissors assembly 38 includes a first scissor arm 40 pivotally mounted to the stationary housing H about a scissor housing pivot point 42 and a second scissor arm 44 at a scissor pivot point 46. The second scissor arm 44 is mounted to scissor link 48 having a scissor link ball 50. The center of the scissor link ball 50 defines a stationary scissors pivot point 52 located on a swash plate in-line plane S which passes through the central pivot point 36. The stationary scissors pivot point 52 is preferably located inboard of the bearing system 25 relative the axis of rotation A.

Figure 3:
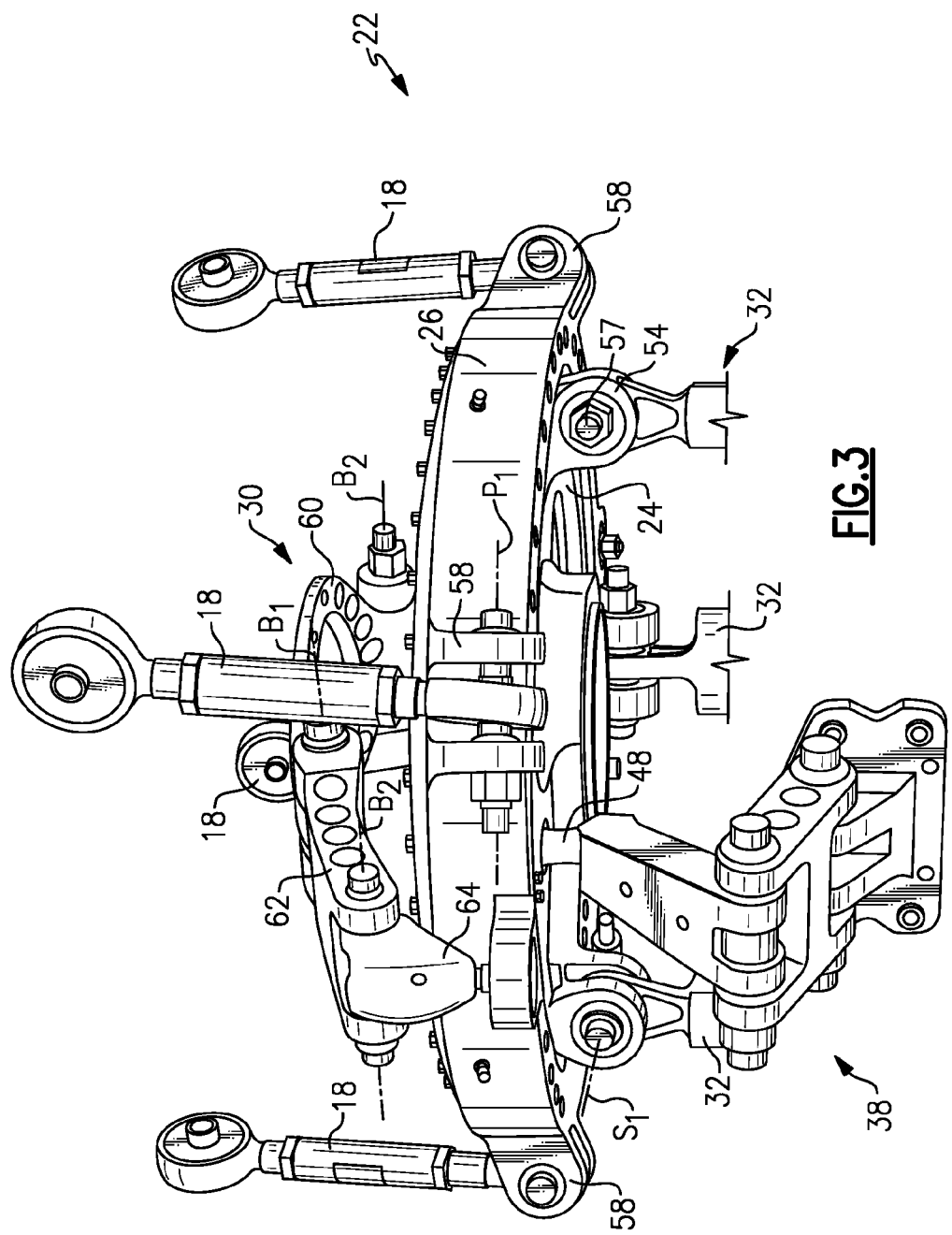
FIG. 3 is a side perspective view of a swash plate assembly according to the present invention.

Each servo control rod 32 is attached to the swash plate assembly 22 to communicate control inputs thereto through a respective servo lug 54 (also illustrated in FIG. 3). Preferably, three servo control lugs 54 (FIG. 3) are circumferentially arranged about the rotationally stationary swash plate 24 at a ninety degree separation with the scissor link 48 defining the fourth ninety degree position.

The three servo lugs 54 extend from the rotationally stationary swash plate 24, preferably below the rotationally stationary swash plate 24. Each servo lug 54 defines a servo pivot point 56 off said in-line plane S inboard of the bearing system 25. As the servo lugs 54 extend below the rotationally stationary swash plate 24, a relatively uncomplicated attachment arrangement is facilitated as compared to a more conventional trunion attachment. Preferably, the attachment is provided by a servo lug fastener 57 such as bolted connection. Such attachment further provides for redundant locking features at a highly inspectable location which simplifies maintenance and increased safety.

Figure 4:
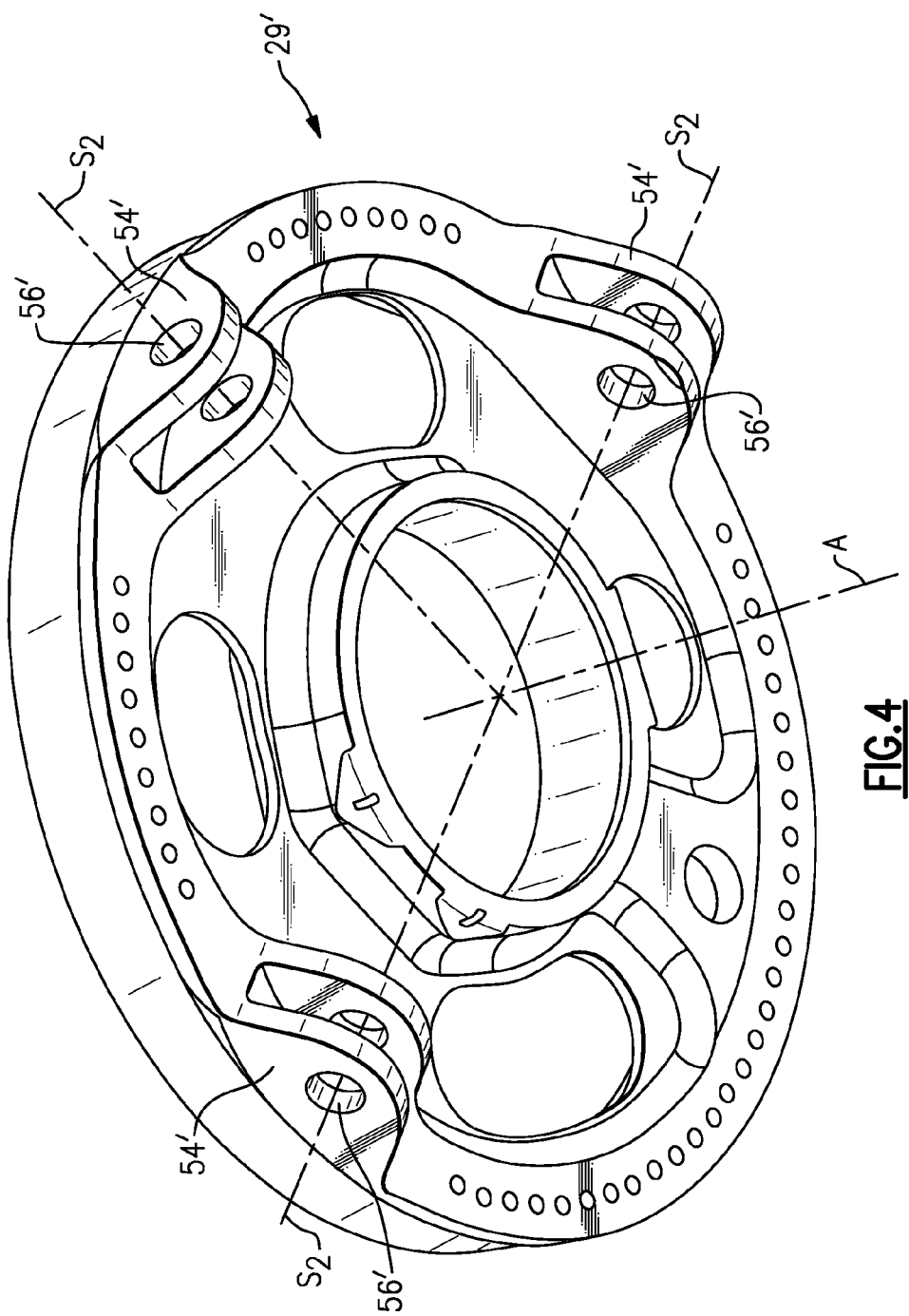
FIG. 4 is a perspective view of another rotational swash plate looking up at the underside of the rotational swash plate assembly.

Preferably, the servo lug 54 is oriented such that the servo lug fastener 57 which defines an axis s1 through said servo pivot point 56 does not intersect the axis of rotation A. Alternatively, a servo lug 54' may be oriented such that an axis s2 through the servo pivot point 56' intersects the axis of rotation A (FIG. 4).

The rotor pitch control point 28 as defined by the rotational swash plate 26 is located on the in-line plane S which passes through the central pivot point 36. Each pitch control rod 18 is attached to the rotational swash plate 26 to communicate pitch commands to a respective rotor blade assembly 16 through a respective pitch lug 58 (also illustrated in FIGS. 1C and 3) which defines the pitch control point 28. Preferably, four pitch lugs 58—one for each rotor blade assembly 16—are located about the outer diameter of the rotational swash plate 26. Preferably, each pitch lug 58 is oriented such that an axis p1 (FIGS. 1C and 3) through each pitch control point 28 is normal to the swash plate assembly 22 and does not intersect the axis of rotation A.

The rotational scissors bridge assembly 30 generally includes a bridge member 60 mounted about the rotor shaft 12 and connected to the rotor hub 14 (FIG. 1B) to transfer rotation to the rotational swash plate 26. A set of bridge arms 62 are pivotally attached to the bridge member 60 at bridge pivot point B1. Each bridge arm 62 is pivotally mounted to a bridge link 64 at a bridge link pivot point B2 (also illustrated in FIG. 3).

The bridge link 64 defines a bridge link ball 66. The center of the bridge link ball 66 defines a rotational scissors bridge assembly pivot point 68 located on the swash plate in-line plane S which passes through the central pivot point 36. The scissors bridge assembly pivot point 68 is preferably located outboard of the bearing system 25 relative the axis of rotation A.

Figure 5:
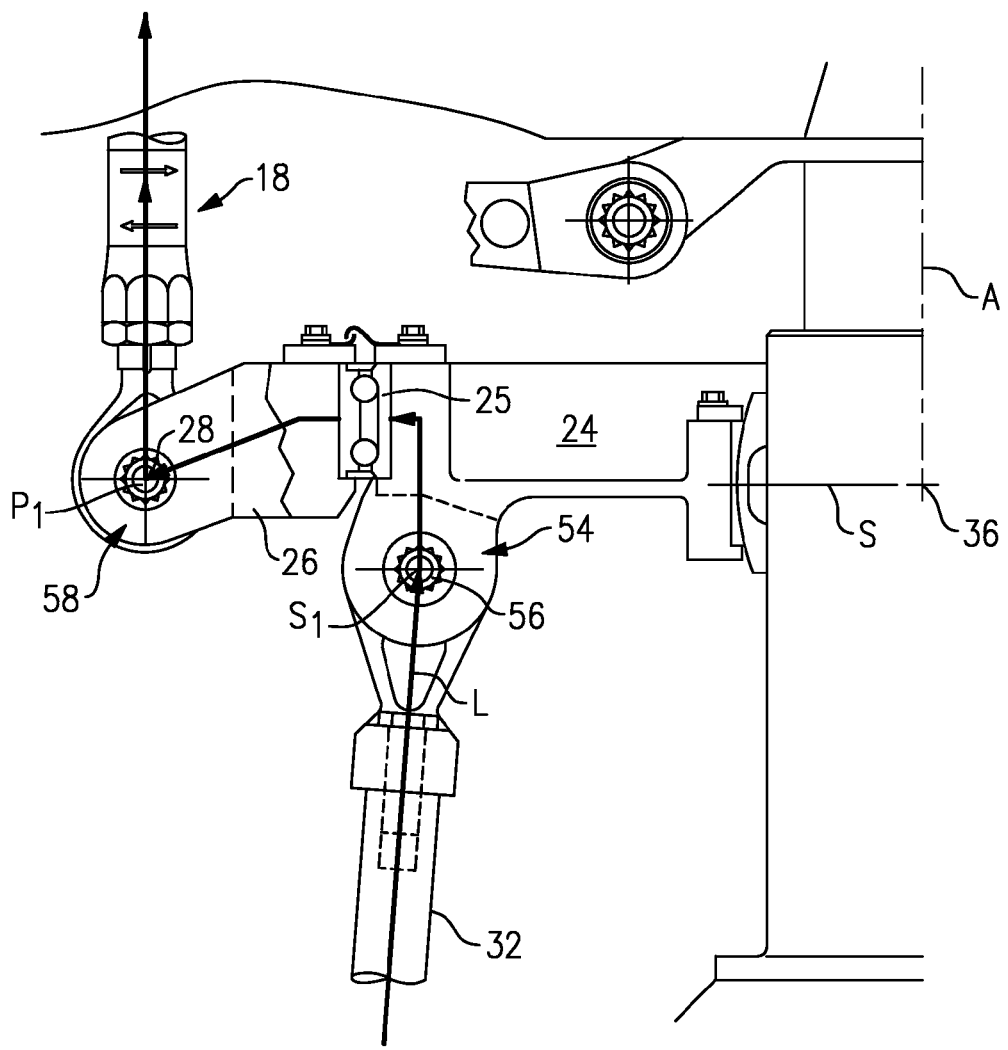
FIG. 5 is a partial sectional view of a swash plate assembly designed according to the present invention showing the load paths through the swash plate assembly.
Figure 6:
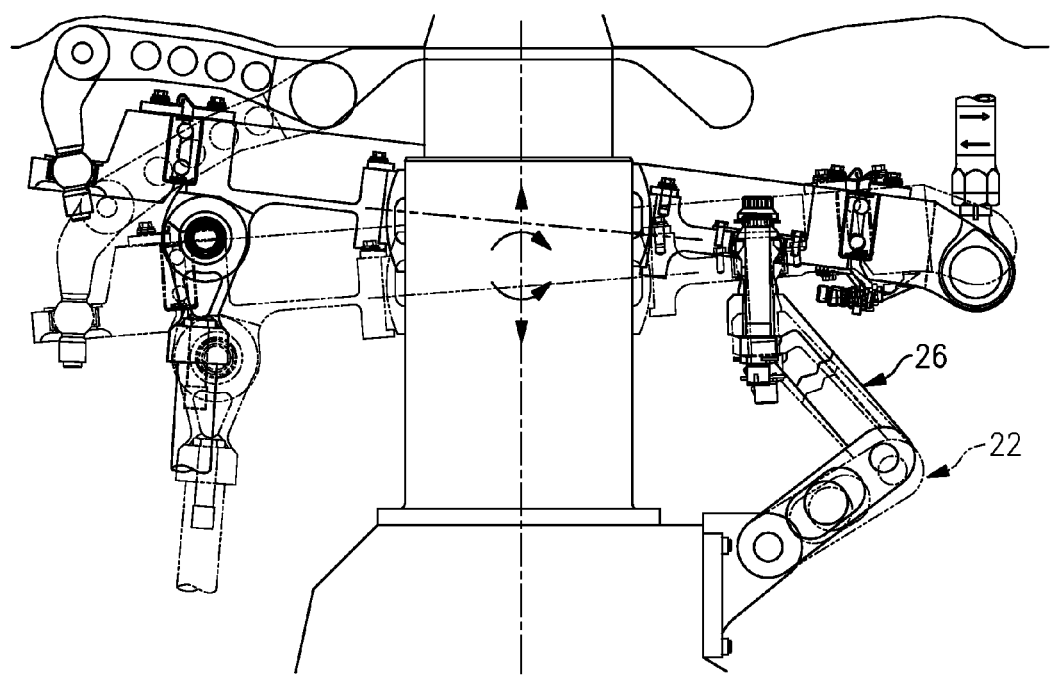
FIG. 6 is a schematic sectional side view of the swash plate assembly at exemplary maximum articulated positions.

By locating the servo pivot point 56 just inboard of the bearing system 25, an exceeding compact load path L is defined thereby. The load path L is defined from the servo control rod 32, to the servo lug 54, through the rotationally stationary swash plate 24, bearing system 25, the rotational swash plate 26, the rotor pitch control point 28 and into the pitch control rod 18 (FIG. 5). The compact dimensions and short load path still, however, provide significant articulation range for the swash plate assembly 22 (FIG. 6).

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A swash plate assembly comprising:
   a rotationally stationary swash plate pivotally mounted about a central pivot point defined along a rotor axis of rotation;
   a rotational swash plate which defines a rotor pitch control point, said rotor pitch control point defined along an in-line plane which passes through said central pivot point;
   a bearing system mounted between said rotationally stationary swash plate and said rotational swash plate; and
   a servo lug which extends from said rotationally stationary swash plate, said servo lug defines a servo pivot point off said in-line plane and radially inboard of said bearing system.

2. The assembly as recited in claim 1, wherein said servo lug is radially inward of said bearing system.

3. The assembly as recited in claim 1, wherein said servo lug extends axially from said rotationally stationary swash plate.

4. The assembly as recited in claim 3, wherein said bearing system is mounted about an outer diameter of said rotationally stationary swash plate.

5. The assembly as recited in claim 1, wherein said bearing system is mounted about an outer diameter of said rotationally stationary swash plate.

6. The assembly as recited in claim 1, wherein said rotationally stationary swash plate and said rotational swash plate are defined along said in-line plane.

7. The assembly as recited in claim 1, further comprising a stationary scissors mounted to said rotationally stationary swash plate at a stationary scissors pivot point, said stationary scissors pivot point located on said in-line plane.

8. The assembly as recited in claim 1, further comprising a rotational scissors bridge assembly mounted to said rotational swash plate at a rotational scissors bridge assembly pivot point, said rotational scissors bridge assembly pivot point located on said in-line plane.

9. The assembly as recited in claim 1, wherein said servo lug extends away from said in-line plane.

10. The assembly as recited in claim 7, wherein said stationary scissors pivot point is located radially in board of a periphery of said rotationally stationary swash plate.

11. The assembly as recited in claim 1, wherein said servo lug extends below said rotational swash plate.

12. The assembly as recited in claim 8, wherein said rotational scissors bridge assembly pivot point is located radially outboard of a periphery of said rotational swash plate.

13. A swash plate assembly comprising:
   a rotationally stationary swash plate pivotally mounted about a central pivot point defined along a rotor axis of rotation;
   a rotational swash plate which defines a rotor pitch control point, said rotor pitch control point defined along an in-line plane which passes through said central pivot point;
   a bearing system mounted between said rotationally stationary swash plate and said rotational swash plate;
   a stationary scissors mounted to said rotationally stationary swash plate at a stationary scissors pivot point, said stationary scissors pivot point located on said in-line plane;
   a rotational scissors bridge mounted to said rotational swash plate at a rotational scissors bridge assembly pivot point, said rotational scissors bridge assembly pivot point located on said in-line plane; and
   a servo lug which extends from said rotationally stationary swash plate, said servo lug defining a servo pivot point off said in-line plane.

14. The assembly as recited in claim 13, wherein said bearing system is mounted between said rotor pitch control point and said servo pivot point.

15. The assembly as recited in claim 13, wherein said rotational scissors bridge assembly pivot point is located inboard of said bearing system relative said axis of rotation.

16. The assembly as recited in claim 15, wherein said stationary scissors pivot point is located radially inboard of said bearing system relative said axis of rotation.

17. The assembly as recited in claim 16, wherein said servo lug is oriented such that an axis through said servo pivot point intersects said axis of rotation.

* * * * *

UNITED STATES PATENT AND TRADEMARK OFFICE
CERTIFICATE OF CORRECTION

| | | |
|---|---|---|
| PATENT NO. | : 8,142,158 B2 | Page 1 of 1 |
| APPLICATION NO. | : 11/292647 | |
| DATED | : March 27, 2012 | |
| INVENTOR(S) | : Schmaling et al. | |

It is certified that error appears in the above-identified patent and that said Letters Patent is hereby corrected as shown below:

IN THE CLAIMS:

Claim 15, Column 6, Line 51: insert --radially-- after "located"

Signed and Sealed this
Fifteenth Day of May, 2012

David J. Kappos
*Director of the United States Patent and Trademark Office*